US006536328B2

United States Patent
Engler

(10) Patent No.: US 6,536,328 B2
(45) Date of Patent: Mar. 25, 2003

(54) DAMPER VALVE FOR HYDRAULIC POWER-ASSISTED STEERING SYSTEM

(75) Inventor: Leonard W. Engler, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/844,721

(22) Filed: Apr. 27, 2001

(65) Prior Publication Data

US 2002/0157711 A1 Oct. 31, 2002

(51) Int. Cl.[7] ............................... F15B 15/22
(52) U.S. Cl. .................. 91/443; 91/447; 137/519.5; 138/46
(58) Field of Search .................. 91/443, 447; 138/46; 137/519.5

(56) References Cited

U.S. PATENT DOCUMENTS

| | | | | |
|---|---|---|---|---|
| 3,106,226 A | * | 10/1963 | Machen | 138/46 X |
| 3,367,362 A | * | 2/1968 | Hoffman | 137/519.5 X |
| 3,489,172 A | * | 1/1970 | Whitmore | 138/46 X |
| 3,837,362 A | * | 9/1974 | Barnes | 137/517 X |
| 4,022,113 A | * | 5/1977 | Blatt | 91/443 |
| 4,704,947 A | * | 11/1987 | Schneider | 91/443 X |
| 4,770,212 A | * | 9/1988 | Wienck | 138/46 X |
| 4,830,046 A | * | 5/1989 | Holt | 137/517 X |
| 5,505,276 A | | 4/1996 | Luibrand | |
| 5,584,226 A | * | 12/1996 | Roemer et al. | 91/447 |
| 5,593,004 A | * | 1/1997 | Blain | 91/447 X |
| 6,003,427 A | | 12/1999 | Asbrand et al. | |
| 6,202,678 B1 | * | 3/2001 | Hawkins | 137/519.5 X |

* cited by examiner

*Primary Examiner*—John Rivell
(74) *Attorney, Agent, or Firm*—Tarolli, Sundheim, Covell & Tummino L.L.P.

(57) ABSTRACT

A damper valve (70) located between a control valve (18) and a power steering motor (22) in a hydraulic power-assisted steering system (10). The damper valve (70) comprises a housing (72) having axially opposite first and second end portions (76 and 78) and an intermediate portion (80) interposed between the first and second end portions (76 and 78). The first end portion (76) is for fluid communication with the control valve (18) and the second end portion (78) is for fluid communication with the power steering motor (22). A flow restricting element (114) is located within the housing (72) and is movable through portions of the housing (72) including the intermediate portion (80) by fluid flow through the housing (72). The damper valve (70) further includes a biasing element (106) for restraining movement of the flow restricting element (114) toward the first end portion (76) of the housing (72). An orifice (116) is formed between the flow restricting element (114) and the housing (72) for restricting fluid flow greater than a predetermined amount through the housing (72) from the second end portion (78) toward the first end portion (76).

11 Claims, 2 Drawing Sheets

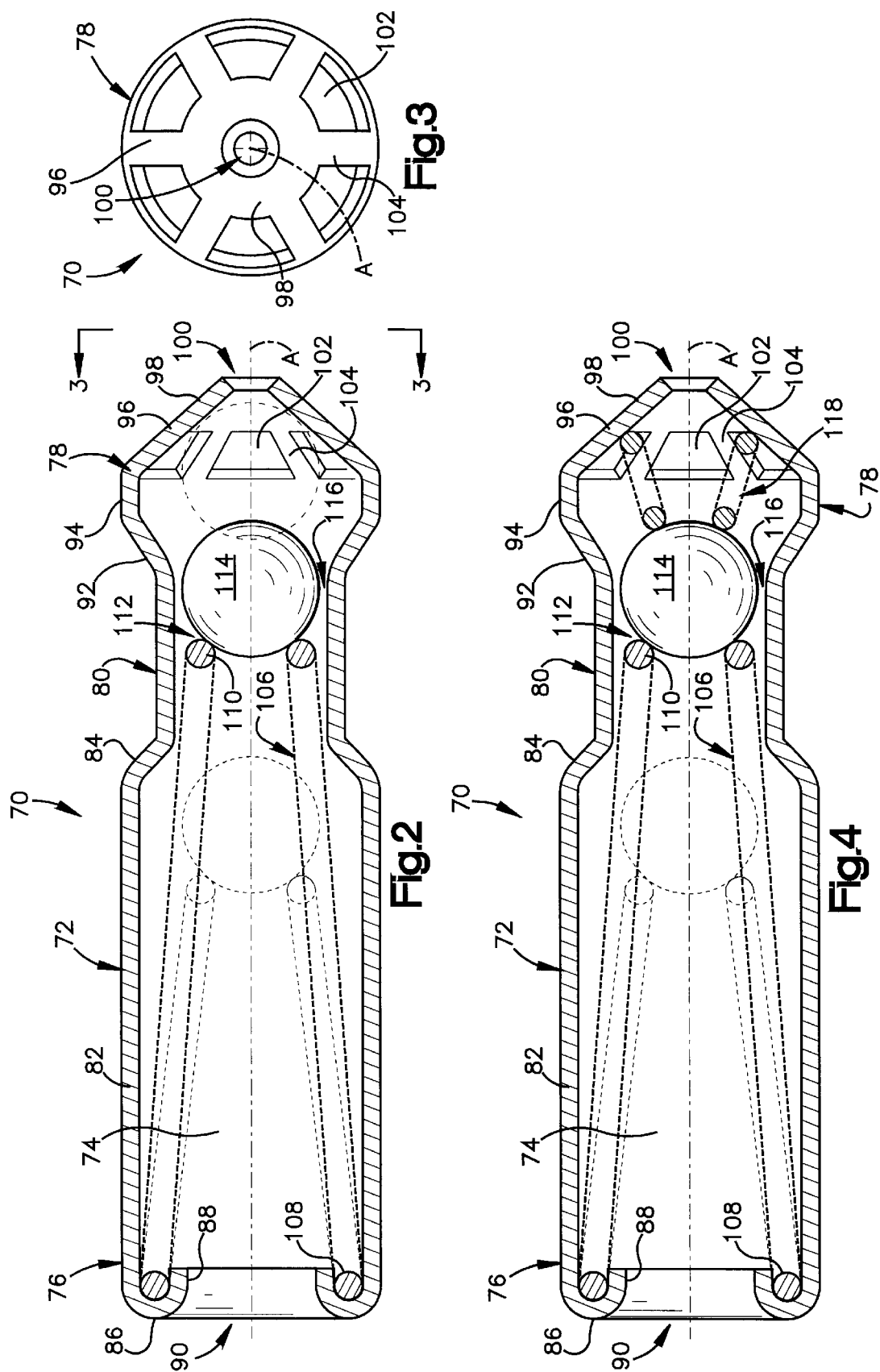

DAMPER VALVE FOR HYDRAULIC POWER-ASSISTED STEERING SYSTEM

TECHNICAL FIELD

The present invention relates to a damper valve for a hydraulic power-assisted steering system, and more particularly, to a damper valve located between a control valve and a power steering motor in a hydraulic power-assisted steering system.

BACKGROUND OF THE INVENTION

It is known to locate a damper valve between a control valve and a power steering motor in a hydraulic power-assisted steering system. Generally, a damper valve is associated with each hydraulic conduit that connects the control valve to the power steering motor.

U.S. Pat. No. 6,003,427 discloses a damper valve for use in a hydraulic power-assisted steering system. The damper valve includes axial bores that are covered by spring plates. Recesses allow fluid access to each axial bore and as fluid pressure within the respective axial bores increases, the spring plate opposite the recess flexes to allow fluid flow through the damper valve. The damper valve also includes a bolt with an axial duct. The axial duct acts as a fluid bypass allowing fluid flow through the damper valve without passing through an axial bore. An adjustable screw partially extends into the axial duct of the bolt to restrict the flow of the fluid bypass. The adjustable screw allows the bypass flow through the axial duct to be calibrated.

SUMMARY OF THE INVENTION

The present invention is a damper valve located between a control valve and a power steering motor in a hydraulic power-assisted steering system. The damper valve comprises a housing having axially opposite first and second end portions and an intermediate portion interposed between the first and second end portions. The first end portion is for fluid communication with the control valve and the second end portion is for fluid communication with the power steering motor. A flow restricting element is located within the housing and is movable through portions of the housing including the intermediate portion by fluid flow through the housing. The damper valve further includes a biasing element for restraining movement of the flow restricting element toward the first end portion of the housing. An orifice is formed between the flow restricting element and the housing for restricting fluid flow greater than a predetermined amount through the housing from the second end portion toward the first end portion.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is a cross-sectional view of the damper valve used in the system of FIG. 1;

FIG. 3 is a view taken along line 3—3 in FIG. 2; and

FIG. 4 is a view of a second embodiment of a damper valve constructed in accordance with the present invention.

DETAILED DESCRIPTION OF THE INVENTION

Figure 1:
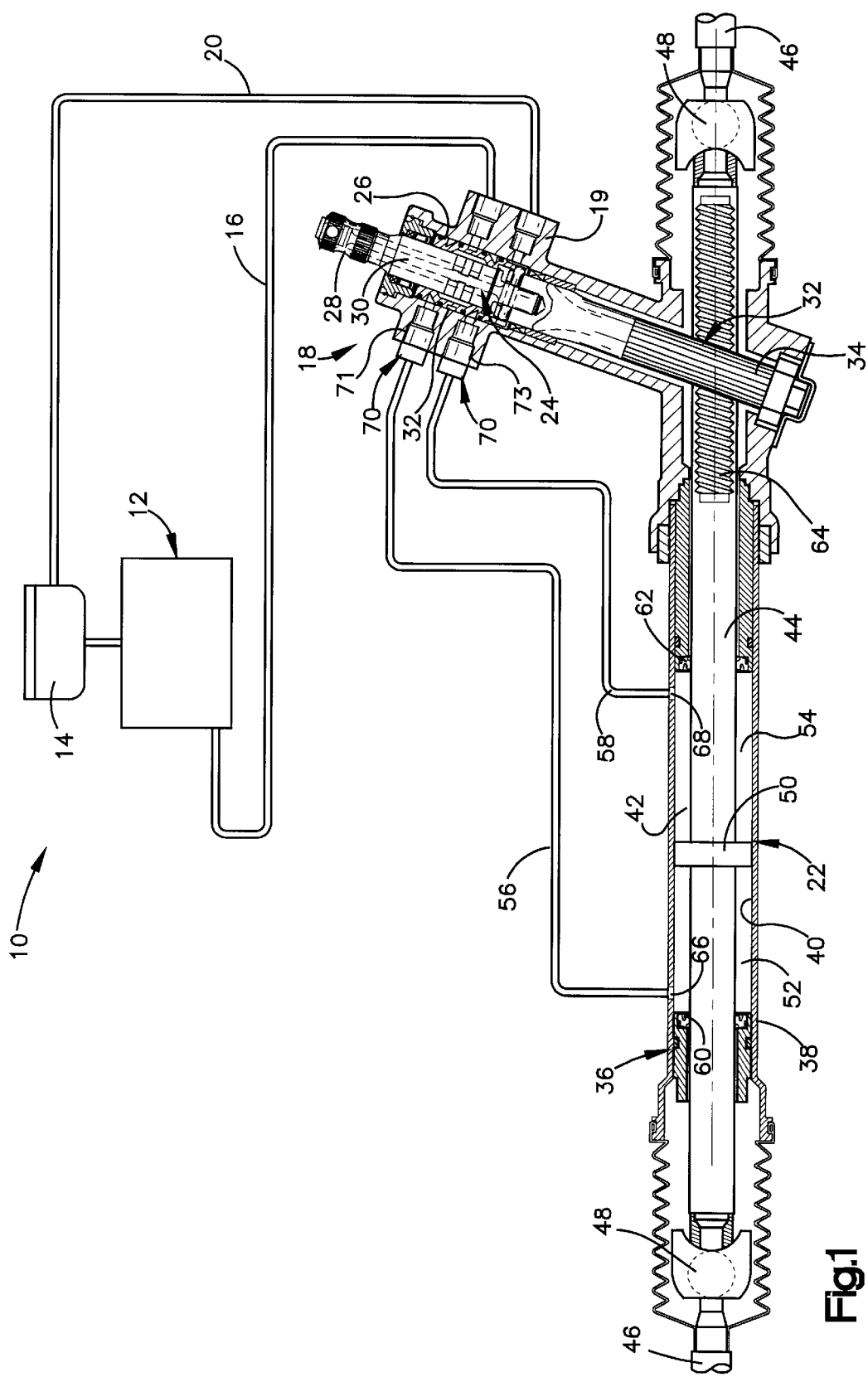
FIG. 1 is a schematic sectional view of a vehicle hydraulic power-assisted steering system including a damper valve constructed in accordance with the present invention.

As illustrated in FIG. 1, a hydraulic power-assisted steering system 10 includes a pump 12. The pump 12 is supplied with fluid from a reservoir 14. Conduit 16 provides fluid communication between an outlet of the pump 12 and a control valve 18. Conduit 20 provides fluid communication between the control valve 18 and the reservoir 14.

The control valve 18 directs the fluid received from the pump 12 to a power steering motor 22. The control valve 18 includes a housing 19, a valve core 24, and a valve sleeve 26. The valve core and the valve sleeve are both located within the housing 19. The valve core 24 of the control valve 18 is rotatably connected to an input shaft 28 of the vehicle. A steering wheel (not shown) is associated with one end of the input shaft 28. As the steering wheel is rotated, the valve core 24 is rotated relative to the valve sleeve 26 for directing fluid to the power steering motor 22.

A pinion gear 32 is connected by a torsion bar 30 to an end of the input shaft 28 opposite the steering wheel. The pinion gear 32 includes a plurality of teeth 34. The pinion gear 32 may be rotated by rotation of the steering wheel.

The power steering motor 22 includes a cylindrical housing 36 with an exterior surface 38 and an interior surface 40. The interior surface 40 of the power steering motor housing 36 defines a cylindrical interior chamber 42 within the housing 36.

A cylindrical rack bar 44 extends through the interior chamber 42 of the power steering motor housing 36. The rack bar 44 is connected to the steerable wheels (not shown) of the vehicle through tie rods 46, which are connected to the ends of the rack bar 44 by ball joints 48. The rack bar 44 moves linearly through the interior chamber 42 of the housing 36 to turn the steerable wheels of the vehicle.

A cylindrical piston 50 is fixedly connected to the rack bar 44. The piston 50 extends radially outwardly from the rack bar 44 toward the interior surface 40 of the power steering motor housing 36. An annular seal ring (not shown) may extend circumferentially around the piston 50 to seal the piston 50 against the interior surface 40 of the housing 36. The piston 50 divides the interior chamber 42 into two variable volume chamber portions 52 and 54. The volume of each chamber portion 52 and 54 of the power steering motor 22 varies as the piston 50 moves linearly within the power steering motor housing 36.

Conduit 56 hydraulically connects chamber portion 52 to the control valve 18, and conduit 58 hydraulically connects chamber portion 54 to the control valve 18. The control valve 18 directs fluid into the respective conduits 56 and 58 and thus, into the respective chamber portions 52 and 54.

The control valve 18 functions as known to those skilled in the art. When the valve core 24 rotates relative to the valve sleeve 26, a differential pressure arises between the two chamber portions 52 and 54 of the power steering motor 22. When a differential pressure arises between the two chamber portions 52 and 54, the piston 50 moves linearly within the housing 36. The piston 50 moves linearly within the housing 36 until the pressure in the respective chamber portions 52 and 54 equalizes. For example, assuming that chamber portion 52 has a fluid pressure that is greater than the fluid pressure in chamber portion 54, the higher pressure of the chamber portion 52 will act on the piston 50 and cause the piston 50 to move (to the right as shown in FIG. 1). The piston 50 will move linearly until the differential pressure between the two chamber portions 52 and 54 is eliminated.

As the piston 50 moves linearly, the volume of chamber portion 54 decreases. As the volume of chamber portion 54 decreases, a portion of the hydraulic fluid within chamber portion 54 is forced out of chamber portion 54. The hydraulic fluid forced out of the decreasing volume chamber portion 54 returns to the control valve 18 through conduit 58. The control valve 18 directs the fluid to conduit 20, which directs the fluid to reservoir 14.

The power steering motor 22 also includes at least two seals 60 and 62. Seal 60 defines an outer wall of chamber portion 52, and seal 62 defines an outer wall of chamber portion 54. Seals 60 and 62 prevent fluid from leaking from the power steering motor 22 as the rack bar 44 moves linearly through the housing 36.

The pinion gear 32 extends into the housing 36 of a power steering motor 22. The teeth 34 of the pinion gear 32 are in meshing engagement with rack teeth 64 of the rack bar 44.

The power steering motor housing 36 further includes two ports 66 and 68. Port 66 extends from the exterior surface 38 of the housing 36 to the interior surface 40 of the housing 36 to provide fluid communication with chamber portion 52. Port 68 extends from the exterior surface 38 of the housing 36 to the interior surface 40 of the housing 36 to provide fluid communication with chamber portion 54.

The system 10 also includes two damper valves 70. Each damper valve 70 is in fluid communication with the control valve 18 and a respective chamber portion 52 and 54 of the power steering motor 22. In the preferred embodiment, one damper valve 70 is inserted in port 71 on the control valve housing 19 and one damper valve is inserted in port 73 on the control valve housing 19. Conduit 56 interconnects the damper valve 70 in port 71 to port 66 of the power steering motor 22. Conduit 58 interconnects to the damper valve 70 in port 73 to port 68 of the power steering motor 22.

As shown in FIG. 2, each damper valve 70 includes a tubular housing 72 with a channel 74 extending axially, relative to axis A, through the housing 72. The housing 72 has axially opposite first and second end portions 76 and 78, respectively. An intermediate portion 80 is interposed between the first and second end portions 76 and 78.

The first end portion 76 of each damper valve housing 72 is in fluid communication with the control valve 18. The first end portion 76 extends axially for approximately sixty percent of the axial length of the damper valve 70. The first end portion 76 includes a cylindrical section 82, which is centered on axis A. The cylindrical section 82 of the first end portion 76 includes a terminal end 86. The terminal end 86 includes an annular lip 88 that folds into the channel 74 of the housing 72. The annular lip 88 defines an opening 90 in the first end portion 76 of the damper valve housing 72. Opening 90 leads into the channel 74 of the damper valve 70.

The first end portion 76 of the housing 72 also includes a tapered section 84. The tapered section 84 is opposite the terminal end 86. The tapered section 84 has a frustoconical shape and extends radially inwardly as it extends axially away from the terminal end 86 of the first end portion 76 of the damper valve housing 72.

The intermediate portion 80 of the damper valve housing 72 is contiguous with the tapered section 84 of the first end portion 76. The intermediate portion 80 is cylindrical and is centered on axis A. A cross-sectional flow area of the intermediate portion 80 is less than a cross sectional flow area of the cylindrical section 82 of the first end portion 76 of the damper valve housing 72. The intermediate portion 80 extends axially for approximately twenty percent of the axial length of the damper valve 70.

The second end portion 78 of the damper valve housing 72 is contiguous with the intermediate portion 80 and is axially opposite the first end portion 76 of the damper valve housing 72. The second end portion 78 is in fluid communication with the power steering motor 22 and extends axially for approximately twenty percent of the axial length of the damper valve 70. The second end portion 78 includes a tapered section 92, a cylindrical section 94, and an end wall section 96.

The tapered section 92 of the second end portion 78 is frustoconical and extends radially outwardly as it extends axially away from the intermediate portion 80 of the damper valve housing 72. The tapered section 92 of the second end portion 78 is a mirror image of the tapered section 84 of the first end portion 76. The widest end of the tapered section 92 abuts the cylindrical section 94 of the second end portion 78.

The cylindrical section 94 of the second end portion 78 of the damper valve housing 72 is centered on axis A. The cylindrical section 94 has a cross-sectional flow area that is equal to the cross-sectional flow area of the cylindrical section 82 of the first end portion 76 of the damper valve housing 72. The cylindrical section 94 of the second end portion 78 abuts the end wall section 96 of the second end portion 78.

A frustoconical end wall 98 forms the end wall section 96 of the second end portion 78. The end wall 98 is centered on axis A and extends radially inwardly as it extends axially away from the intermediate portion 80 of the damper valve housing 72. The end wall 98 terminates in a central opening 100 that is centered on axis A and provides access into the channel 74 of the damper valve 70. The end wall 98 includes six windows 102 (FIG. 3) that are spaced in a circular array around axis A, as shown in FIG. 3. A rib 104 extends between and separates each window 102 in the circular array from an adjacent window 102 in the circular array. As a result, the end wall 98 includes six ribs 104. Each window 102 leads into the channel 74 of the damper valve 70. The total flow area of the six windows 102 and the central opening 100 is greater than the flow area of the opening 90 in the first end portion 76 of the damper valve housing 72. The reasoning for the flow area of the six windows 102 and the central opening 100 being greater than the flow area of opening 90 will become apparent to those skilled in the art after reference to the remainder of this description.

The damper valve 70 also includes a biasing element that extends through a portion of the channel 74 of the housing 72. Preferably, the biasing element is a helical spring 106, as illustrated in FIG. 2. The helical spring 106 is frustoconically shaped and is centered on axis A. The helical spring 106 includes a wide end 108 and a narrow end 110. The wide end 108 of the helical spring 106 attaches to the first end portion 76 of the housing 72. Preferably, the lip 88 at the terminal end 86 of the first end portion 76 of the housing 72 clamps the wide end 108 of the helical spring 106 against an inner surface of the first end portion 76 of the housing 72. Those skilled in the art will recognize that other methods of attaching the helical spring 106 to the housing 72 may be used.

In an uncompressed state, the helical spring 106 extends through the axial length of the first end portion 76 of the housing 72 and through approximately half of the intermediate portion 80 of the housing 72. The narrow end 110 of the helical spring 106 forms a seat 112 that is engageable by a flow restricting element.

The flow restricting element, preferably a spherical ball 114, is located in the channel 74 of the housing 72 between the narrow end 110 of the helical spring 106 and the end wall 98 of the second end portion 78 of the housing 72. The ball 114 is movable through the portions 76, 78 and 80 of the housing 72 as will become clear to those skilled in the art with reference to the remainder of this description.

In the preferred embodiment, the damper valve 70 restricts fluid flow passing through the channel 74 of the housing 72 from the second end portion 78 toward the first end portion 76 and does not restrict fluid flow passing through the channel 74 of the housing 72 from the first end portion 76 toward the second end portion 78. Restriction of fluid flow means that flow through the damper valve 70 is limited to a predetermined amount of fluid. The flow of any amount of fluid greater than the predetermined amount will result in a pressure increase on the supply side of the damper valve 70.

During fluid flow through the damper valve 70 from the first end portion 76 toward the second end portion 78, fluid contacts the ball 114 and moves the ball 114 axially into the second end portion 78 of the housing 72 and against the end wall 98 of the second end portion 78 of the housing 72. Fluid flow past the ball 114 maintains the ball 114 in the second end portion 78 of the housing 72. The area of the six windows 102 in the second end portion 78 of the damper valve 70 should be sized to allow unrestricted fluid flow through the damper valve 70 when the ball is in the second end portion 78 of the housing 72.

During fluid flows through the damper valve 70 from the second end portion 78 toward the first end portion 76, fluid moves the ball 114 against the seat 112 formed by the narrow end 110 of the helical spring 106. When the ball 114 is seated on the narrow end 110 of the helical spring 106, fluid flow over the predetermined amount through the damper valve 70 is restricted. When the ball 114 is in the intermediate portion 80 of the housing 72, an annular orifice 116 between the ball 114 and an inner surface of the intermediate portion 80 is the only area allowing fluid flow. Those skilled in the art will recognize that for the ball 114 to restrict fluid flow through the damper valve, the flow area of annular orifice 116 must be less than the flow area of both the six windows 102 and central opening 100 in the second end portion 78 of the damper valve 70 and the opening 90 in the first end portion 76 of the damper valve 70. The orifice 116 allows a predetermined amount of fluid to pass between the ball 114 and the inner surface of the intermediate portion 80 of the damper valve 70 before a differential pressure is created between the second end portion 78 and the first end portion 76 of the damper valve 70. When fluid flow is greater than the predetermined amount, fluid flow becomes restricted and the fluid pressure on the second end portion 78 side of the ball 114 increases relative to the pressure on the first end portion 76 side of the ball 114 as the ball 114.

As the pressure differential between the second end portion 78 of the damper valve 70 and the first end portion 76 of the damper valve 70 increases, the force exerted on the ball 114 by the fluid pressure compresses the helical spring 106. The helical spring 106 has a predetermined rate of compression. When the differential pressure increases to a second predetermined amount, the helical spring 106 is compressed a distance sufficient to locate the ball 114 in the first end portion 76 of the housing 72. When the ball 114 enters the first end portion 76 of the housing 72, fluid flow increases as the orifice 116 increases in flow area. When the differential pressure across the damper valve 70 decreases below the second predetermined amount, the helical spring 106 expands and the ball 114 returns to the intermediate portion 80 of the housing 72.

When a damper valve 70 is used between the control valve 18 and a respective chamber portion 52 or 54 of a power steering motor 22 in a hydraulic power-assisted steering system 10, the damper valve 70 will resist fluid flow out of a power steering motor 22 and toward the control valve 18. Thus, if the steerable wheels of the vehicle hit a rough portion of the road, the damper valve 70 will resist fluid flow out of a respective chamber portion 52 or 54 and thus, resist movement of the piston 50 in the power steering motor 22. As a result, the steerable wheels of the vehicle will be less likely to be turned by the rough road.

The damper valve 70 will not reduce the response of the power steering motor 22 to steering input from the driver. As the driver rotates the steering wheel, the control valve 18 will direct fluid to a respective chamber portion 52 or 54 of the power steering motor 22. As a result, a pressure differential will be created between the two chamber portions 52 and 54 of the power steering motor 22. This pressure differential causes the piston 50 to move to increase the volume of one chamber portion 52 or 54 and to decrease the volume of the other chamber portion 52 or 54 until the fluid pressures in the two chamber portions 52 and 54 equalizes. As the piston 50 moves to decrease the volume of a chamber portion 52 or 54, the pressure within that chamber portion 52 or 54 increases and fluid is forced out of the chamber portion 52 or 54.

The fluid forced out of the decreasing volume chamber portion 52 or 54 creates a differential pressure across the damper valve 70. Preferably, the spring 106 will be selected so that the differential pressure created by normal operation of the power steering motor 22 causes the spring 106 to compress a distance sufficient to move the ball 114 into the first end portion 76 of the damper valve 70. When the spring 106 is compressed such that the ball 114 enters the first end portion 76 of the damper valve housing 72, the fluid flow through the damper valve 70 from the second end portion 78 toward the first end portion 76 should be sufficient to handle the fluid flow out of the decreasing volume chamber portion 52 or 54 of the power steering motor 22.

Those skilled in the art will recognize that by changing the rate of compression of the helical spring 106 and the size of the annular orifice 116 between the ball 114 and the inner surface of the intermediate portion 80 of the housing 72, the flow characteristics of the damper valve 70 of the present invention can be adjusted.

FIG. 4 illustrates a second embodiment of a damper valve 70 constructed in accordance with the present invention. The damper valve 70 of FIG. 4 is identical to the damper valve 70 illustrated in FIGS. 2 and 3 with the exception that the damper valve 70 of FIG. 4 also includes a biasing element for restraining movement of the ball 114 toward the second end portion 78 of the housing 72. Structures of FIG. 4 that are identical to those illustrated in FIGS. 2 and 3 are identified by the same reference numerals.

The biasing element for restraining movement of the ball 114 toward the second end portion 78 of the housing 72 is preferably a helical spring 118. The helical spring 118 extends between the end wall 98 of the second end portion 78 of the damper valve 70 and the ball 114 and restricts movement of the ball 114 toward the second end portion 78 of the damper valve housing 72. The helical spring 118 has a known rate of compression. Thus, the damper valve 70 of FIG. 4, restricts fluid flow through the damper valve 70 in both directions.

The use of helical spring 118 in the second end portion 78 of the housing 72 allows the damper valve 70 to restrict fluid flow from the first end portion 76 toward the second end portion 78. The annular orifice 116 between the ball 114 and the inner surface of the intermediate portion 80 of the damper valve 70 restricts fluid flow above the predetermined amount. As a result, fluid flow above the predetermined amount creates a differential pressure between the first end portion 76 and the second end portion 78 of the damper valve 70. As the differential pressure increases, helical spring 118 is compressed and the ball 114 moves into the second end portion 78 of the damper valve 70. As the ball 114 moves into the second end portion 78 of the damper valve 70, fluid flow increases. When the differential pressure decreases, the helical spring 118 expands and the ball 114 is moved back into the intermediate portion 80 of the damper valve 70.

From the above description of the invention, those skilled in the art will perceive improvements, changes and modifications. Such improvements, changes and modifications within the skill of the art are intended to be covered by the appended claims.

Having described the invention, the following is claimed:

1. A damper valve located between a control valve and a power steering motor in a hydraulic power-assisted steering system, the damper valve comprising:

a housing having axially opposite first and second end portions and an intermediate portion interposed between the first and second end portions;

the first end portion of the housing being for fluid communication with the control valve and the second end portion of the housing being for fluid communication with the power steering motor;

a flow restricting element located within the housing and being movable through portions of the housing including the intermediate portion by fluid flow through the housing; and a biasing element for restraining movement of the flow restricting element toward the first end portion of the housing;

an orifice being formed between the flow restricting element and the housing for restricting fluid flow greater than a predetermined amount through the housing from the second end portion toward the first end portion.

2. A damper valve located between a control valve and a power steering motor in a hydraulic power-assisted steering system, the damper valve comprising:

a housing having axially opposite first and second end portions and an intermediate portion interposed between the first and second end portions;

the first end portion of the housing being for fluid communication with the control valve and the second end portion of the housing being for fluid communication with the power steering motor;

a flow restricting element located within the housing and being movable through portions of the housing including the intermediate portion by fluid flow through the housing; and a biasing element for restraining movement of the flow restricting element toward the first end portion of the housing;

an orifice being formed between the flow restricting element and the housing for restricting fluid flow greater than a predetermined amount through the housing from the second end portion toward the first end portion, the first end portion of the housing having at least one opening for accessing a channel within the housing; and the second end portion of the housing having an end wall for retaining the flow restricting element in the housing, the end wall including a plurality of windows for accessing the channel of the housing.

3. The damper valve of claim 2 further being defined by:
fluid flow from the first end portion toward the second end portion causing the flow restricting element to move into the second end portion of the housing.

4. The damper valve of claim 2 further being defined by:
fluid flow from the second end portion toward the first end portion causing the flow restricting element to move against the biasing element.

5. The damper valve of claim 4 further being defined by:
the biasing element having a predetermined rate of compression;
the flow restricting element compressing the biasing element as fluid pressure in the second end portion of the housing increases relative to fluid pressure in the first end portion of the housing.

6. A damper valve located between a control valve and a power steering motor in a hydraulic power-assisted steering system, the damper valve comprising:

a housing having axially opposite first and second end portions and an intermediate portion interposed between the first and second end portions;

the first end portion of the housing being for fluid communication with the control valve and the second end portion of the housing being for fluid communication with the power steering motor;

a flow restricting element located within the housing and being movable through portions of the housing including the intermediate portion by fluid flow through the housing; and a biasing element for restraining movement of the flow restricting element toward the first end portion of the housing;

an orifice being formed between the flow restricting element and the housing for restricting fluid flow greater than a predetermined amount through the housing from the second end portion toward the first end portion, the first end portion of the housing having a terminal end for retaining a first end of the biasing element, the terminal end of the first end portion being turned inwardly into the housing to clamp the first end of the biasing element to the housing.

7. The damper valve of claim 6 further being defined by:
the biasing element further including a second end, the second end of the biasing element being axially spaced from the first end and forming a seat for retaining the flow restricting element during fluid flow from the second end portion of the housing toward the first end portion of the housing.

8. The damper valve of claim 7 further being defined by:
the biasing element being a helically wound spring; and
the flow restricting element being a spherical ball.

9. The damper valve of claim 8 further being defined by:
the helically wound spring having a frustoconical shape with the first end having a diameter that is greater than a diameter of the second end.

10. A damper valve located between a control valve and a power steering motor in a hydraulic power-assisted steering system, the damper valve comprising:

a housing having axially opposite first and second end portions and an intermediate portion interposed between the first and second end portions;

the first end portion of the housing being for fluid communication with the control valve and the second end portion of the housing being for fluid communication with the power steering motor;

a flow restricting element located within the housing and being movable through portions of the housing including the intermediate portion by fluid flow through the housing;

a biasing element for restraining movement of the flow restricting element toward the first end portion of the housing;

an orifice being formed between the flow restricting element and the housing for restricting fluid flow greater than a predetermined amount through the housing from the second end portion toward the first end portion; and a biasing element for restraining movement of the flow restricting element toward the second end portion of the housing.

11. A damper valve located between a control valve and a power steering motor in a hydraulic power-assisted steering system, the damper valve comprising:

a housing having axially opposite first and second end portions and an intermediate portion interposed between the first and second end portions, the intermediate portion of the housing being a fluid flow restricting portion of the housing;

the first end portion of the housing being for fluid communication with the control valve and the second end portion of the housing being for fluid communication with the power steering motor;

a flow restricting element located within the housing and being movable through portions of the housing including the intermediate portion by fluid flow through the housing;

a biasing element for resisting movement of the flow restricting element from the intermediate portion and into the first end portion of the housing during fluid flow from the second end portion of the housing toward the first end portion of the housing;

an orifice being formed between an outer surface of the flow restricting element and an inner surface of the housing, the orifice restricting fluid flow from the second end portion toward the first end portion of greater than a predetermined amount until fluid pressure overcomes resistance of the biasing element and moves the flow restricting element into the first end portion of the housing, the orifice increasing in size when the flow restricting element is in the first end portion of the housing to permit fluid flow of greater then the predetermined amount.

* * * * *